United States Patent [19]

Chung et al.

[11] Patent Number: 4,923,756

[45] Date of Patent: May 8, 1990

[54] PRIMERLESS ADHESIVE FOR FIBERGLASS REINFORCED POLYESTER SUBSTRATES

[75] Inventors: Daniel A. Chung, Dublin; Laurence G. Dammann, Westerville, both of Ohio

[73] Assignee: Ashland Oil, Inc., Russell, Ky.

[21] Appl. No.: 87,194

[22] Filed: Aug. 20, 1987

[51] Int. Cl.$^5$ .................. B32B 27/08; B32B 27/36; B32B 27/40
[52] U.S. Cl. .................. 428/423.7; 156/307.3; 428/480
[58] Field of Search .................. 428/480, 423.7, 414; 525/458; 523/209; 156/307.3

[56] References Cited

U.S. PATENT DOCUMENTS

| | | | |
|---|---|---|---|
| 3,935,051 | 1/1976 | Bender et al. | 523/209 XZ |
| 3,945,875 | 3/1976 | Jackson | 428/423.7 XZ |
| 4,004,050 | 1/1977 | Rabito et al. | 428/423.7 XZ |
| 4,500,606 | 2/1985 | Rabito et al. | 428/414 XZ |
| 4,552,934 | 11/1985 | Rabito et al. | 525/458 |
| 4,576,979 | 3/1986 | Schupp et al. | 525/458 XZ |

*Primary Examiner*—Thomas J. Herbert
*Attorney, Agent, or Firm*—Mary E. Picken

[57] ABSTRACT

A laminated fiberglass reinforced polyester (FRP) substrate made using a primerless adhesive and the process of making the laminated FRP substrate. The primerless adhesive combines a prepolymer, an aliphatic polyisocyanate and a curative.

8 Claims, No Drawings

4,923,756

PRIMERLESS ADHESIVE FOR FIBERGLASS REINFORCED POLYESTER SUBSTRATES

This invention relates to polyurethane adhesives for bonding fiberglass reinforced polyester substrates which are used in the manufacture of, typically, automobile and marine bodies.

BACKGROUND OF THE INVENTION

Polyurethane structural adhesives have been used for many years in industry to adhere parts fabricated from fiberglass reinforced polyester (FRP) materials. These materials are also commonly referred to as sheet molding compound (SMC).

The adhesive bonds must be strong and must maintain their strength both at elevated temperatures and when exposed to wet environments. Over the years substantial research effort has been devoted to improving the strength of these polyurethane structural adhesives. Two patents serve to describe what are, at the present time, typical commercially available polyurethane structural adhesives. U.S. Pat. No. 3,935,051, "Polyurethane Composition and Laminates Made Therewith", combines a prepolymer component and a curative to make an adhesive for FRP panels. The prepolymer component is the reaction product of polypropylene glycol and toluene diisocyanate. The curative contains polypropylene ether glycol and N, N, N', N'-tetrakis (2-hydroxypropyl) ethylene diamine. Bond strengths were reported to be greater than 60 pounds per square inch.

U.S. Pat. No. 4,552,934, "Two-Component Adhesive Sag Resistant At Essentially 1:1 Ratio", describes another two component polyurethane adhesive also having a prepolymer component and a curative component. This prepolymer is polypropylene ether glycol reacted with aromatic isocyanate and has 3 to 15 percent by weight free isocyanate. The curative is polypropylene ether glycol and polypropylene ether triol partially reacted with some polyarylmethane polyisocyanate before adding polyamine.

In addition to improvements in the formulations of the adhesive components themselves, a great deal of work has been directed to the development of primers to be used on FRP substrates to better prepare the substrate for application of the polyurethane adhesive. Primers generally are assumed to be absolutely essential elements for strongly bonded laminates.

Bond strength measurements are made both at room temperature and at elevated temperature, that is, at 82° C. Only those adhesives having high bond strengths at 82° C. are considered to be acceptable by the automotive industry. While adhesives used without primers may pass room temperature strength tests, at present only the use of primers provides adequate bond strengths at 82° C.

For example, the General Motors Corporate Specifications for new plastic automotive substrates require the use of wash primers on test substrates prior to the application of adhesives to these candidate substrates.

A number of representative patents serve to illustrate the efforts made to improve bond strengths by developing better primers. U.S. Pat. No. 3,647,513, "Method for Improving the Adhesion of Polyester Compositions", teaches the need for a surface treating agent to enhance the bond strength between adhesives and fiberglass reinforced polyester substrates. The surface treating agent or primer recommended is a tertiary amine in low-boiling inert organic liquid solvent.

U.S. Pat. No. 3,945,875, "Method For Obtaining Polyester Laminates", teaches the use of a surface treating agent on FRP substrates prior to use of a polyester adhesive. The recommended surface treatment agent is an organic isocyanate containing ethylenic unsaturation. The isocyanate is used in a toluene or methyl ethyl ketone solution.

U.S Pat. No. 4,004,050, "Two-Part Primer System for FRP Bonding", states that adhesion between a polyurethane adhesive and a polyester surface is improved by treating the surface with separate applications of an organic polyisocyanate and a tertiary amine, each applied in solvent solution to the polyester surface. Methylethyl ketone and the halogenated hydrocarbon, chlorinated naptha, are recommended solvents for the surface treatment agents. Practice of this invention requires three steps; that is, two surface treatments followed by application of the adhesive.

U.S. Pat. No. 4,500,606, "Sealer of Polyester and Method of Use to Obtain Laminates", teaches the need for surface treatment of FRP substrates with a sealer prior to the use of polyurethane adhesives. The recommended sealer is a mixture of phenol-formaldehyde resin, polyvinyl acetal film former and epoxy resin. This is a typical two step procedure requiring application of a sealer (or primer) followed by application of the adhesive.

Commercially available primers often contain chlorinated hydrocarbons such as methylene chloride, a compound under study by the Environmental Protection Agency as being hazardous in the work place. Manufacturers are actively studying ways to minimize or eliminate this and other harmful solvents from the work environment.

It would be a great improvement over the present technology if the cumbersome two-step process of first applying primer and then applying adhesive could be streamlined into a one step process in which the primer step was completely eliminated and the adhesive applied directly onto the FRP substrate. Elimination of the primer would be a significant advance not only in the saving of time, but also, in the elimination of a solvent-exposure opportunity, thus improving the environment for the workers.

OBJECT OF THE INVENTION

It is therefore an object of this invention to eliminate the use of primer on FRP substrates. It is also an object of this invention to provide a primerless adhesive which retains high bond strength at elevated temperatures. It is a further object of this invention to provide a primerless adhesive which is stronger at elevated temperatures than commercially available primer-requiring adhesives.

BROAD STATEMENT OF THE INVENTION

The present invention is a primerless polyurethane structural adhesive for fiberglass reinforced polyester (FRP), sheet molding compound (SMC) and other reinforced plastic substrates wherein the adhesive comprises two parts: a first part which is a blend of a prepolymer component and an aliphatic isocyanate and a second part which is a curative. The prepolymer is the reaction product of a polyol and an aromatic isocyanate, the prepolymer product having 3 to 15 percent free isocyanate groups. The curative part comprises a polyfunctional polyether polyol and optionally a catalyst.

In one embodiment the present invention is a method of laminating FRP, SMC and plastic substrates comprising applying an adhesive to a first unprimed substrate, said adhesive comprising a first part which is a blend of a prepolymer and an aliphatic isocyanate and a second part which is a curative and laminating a second unprimed substrate to said first adhesive coated substrate. A final optional heating step may follow the laminating step.

In another embodiment the present invention is a laminated substrate composition comprising a first unprimed FRP, SMC or plastic substrate having a second unprimed FRP, SMC or plastic substrate adhesively bound to said first substrate by a cured adhesive composition which is the cured residue of an adhesive comprising a first part blend of a prepolymer and an aliphatic isocyanate, said prepolymer comprising the reaction product of a polyol and an aromatic isocyanate and having 3 to 15 percent free isocyanate groups and a second part curative comprising a polyfunctional polyether polyol and optionally a catalyst. Additional optional ingredients in the curative are fillers, diamine sag control agents and pigments.

Advantages of the present invention include the elimination of the use of a primer prior to application of a polyurethane adhesive to FRP substrates. Another advantage of this invention is the elimination of primer solvent in the workplace. Still a further advantage of this invention is the provision of a laminate having bond strengths superior to those made using conventional primer-requiring adhesives. Yet another advantage, which will become apparent in the Examples, is that the novel process provides laminates which are stronger at the 82° C. test temperature than the bonds made using primer-requiring adhesives. These and other advantages of the primerless adhesive of the present invention will become readily apparent to those skilled in the art based upon the disclosure contained herein.

DETAILED DESCRIPTION OF THE INVENTION

This invention, a primerless adhesive, a method of laminating using a primerless adhesive, and/or a laminated substrate made with a primerless adhesive has several embodiments.

In one embodiment the primerless adhesive of this invention comprises a prepolymer blended with an aliphatic isocyanate and a curative. The prepolymer is the reaction product of a polyol and an aromatic isocyanate. The curative comprises a polyfunctional polyether polyol and optionally a catalyst.

The adhesive of this invention is particularly well adapted for use on fiberglass reinforced polyester substrates. These substrates are made from, typically, the reaction product of dipropylene glycol, maleic anhydride, high molecular weight polyvinyl acetate, styrene, peroxide polymerization initiator and fillers.

The invention is adaptable for use on a variety of other substrates including metals, polycarbonates, other plastics such as reaction injection molding (RIM) polyurethanes, acrylonitrile-butadiene-styrene (ABS) terpolymers, styrene acrylonitrile copolymers (SAN), thermoplastic polyolefins (TPO) and thermoplastic alloys such as polycarbonate-polyester blends and polycarbonate-ABS blends. Among the useful fibers used in reinforcing the substrates are fiberglass, graphite and Kevlar polyamide fiber.

Among the fiberglass reinforced polyester substrates useful in the practice of this invention are those provided by Diversitech General, Marion, Indiana (GT-7113, GT-8002 and GT-7101 substrates), Rockwell International Corporation, Centralia, Illinois (RW 9468 Substrate) and Budd Company, Madison Heights, Michigan (DSM 950 Substrate).

The preferred polyol ingredient of the prepolymer of this invention is described in U.S. Pat. No. 4,552,934 where about 100 parts of an active hydrogen containing material having a molecular weight of 700 to 4500, and preferably from about 1000 to 3500, is reacted with 30 to 120 parts of an organic polyisocyanate as a mixture of aromatic organic polyisocyanates. Usually, reaction time at elevated temperature is chosen to give a prepolymer in one to several hours. These prepolymers usually have from 3 to 15 percent free isocyanate with 7 to 10 percent free isocyanate being preferred.

The active hydrogen containing material in the prepolymer component of the adhesive may be 700 to 4,000 molecular weight polypropylene oxide ether diol, polyethylene oxide polypropylene oxide ether diol, polytetramethylene ether glycol, polyepsilon caprolactone diol, polycarbonate diol, polybutadiene diol or mixtures of these diols. The preferred active hydrogen containing material is a polypropylene oxide ether diol of 2000 molecular weight.

The second ingredient of the prepolymer component of the adhesive of this invention is an aromatic polyisocyanate. Among the useful aromatic polyisocyanates are: polymethylene polyphenyl isocyanate, 2,4-toluene diisocyanate, 2,4-2,6 (80/20) toluene diisocyanate, 4,4'-diphenylmethane diisocyanate, 1,4-phenylene diisocyanate, 3,3'-dimethoxy -4,4'-biphenyl diisocyanate, 3,3'-dimethyl- 4,4'-biphenyl diisocyanate, 3,3'-dimethyl-4,4'-diphenyl methane diisocyanate, or mixtures of these diisocyanates. One preferred aromatic polyisocyanate is a modified diphenyl methane diisocyanate available as Isonate 143L isocyanate from Upjohn Polymer Chemicals, La Porte, Tex. This modified diphenyl methane diisocyanate contains a high percentage of pure diphenylmethane diisocyanate and a lesser amount of polycarbodiimide adducts.

Also preferred is the polymethylene polyphenyl isocyanate available as Mondur MRS isocyanate from Mobay Chemical Corporation, Pittsburgh, Pa. The most preferred aromatic polyisocyanate in the prepolymer of the primerless adhesive of this invention is a mixture of Isonate 143L isocyanate and Mondur MRS isocyanate.

Optional ingredients in the prepolymer component of the adhesive of this invention include fillers. Representative examples of inert powdery fillers are: aluminum silicates, carbon black, talcs (magnesium silicates), calcium carbonate, calcium silicates, barium sulfates, graphite, or mixtures of fillers. The preferred filler ingredient is talc.

Additional optional ingredients in the prepolymer component include catalysts such as zinc stearate and antioxidants such as Irganox 1010 antioxidant available from Ciba Geigy Corporation, Ardsley, N.Y.

The aliphatic isocyanate component of the primerless adhesive of this invention is defined herein as any polyfunctional isocyanate having aliphatic carbon atoms adjacent to the isocyanate groups. These aliphatic carbon atoms are thus alpha to the isocyanate groups.

There may be aromatic functionality elsewhere in the organic isocyanate compound, but these compounds are referred to herein as aliphatic isocyanates because of the aliphatic nature of the carbon atom alpha to the isocyanate groups. These alpha carbon atoms may be primary, secondary or tertiary, that, is, either they may have, respectively two, one or no hydrogen atoms; and may be linear or part of a cyclic chain. In addition to the aromatic functionality, the aliphatic isocyanates used in this invention may contain other functional groups compatible with the aliphatic isocyanate, such as unsaturation, ether, mercapto, carbonyl, carboxyl, ester, halogen, etc.

Among the preferred aliphatic polyfunctional isocyanates are:
isophorone diisocyanate (IPDI)
bis (4-isocyanatocyclohexyl) methane (Desmodur W)
m-xylylene diisocyanate (MXDI)
1,3-bis (isocyanatomethyl) cyclohexane (1,3-BIC)
m-tetramethyl xylene diisocyanate (m-TMXDI)
dimethyl-p-isopropenyl benzyl isocyanate (p-TMI)
1,4-cyclohexane diisocyanate (CHDI)
trimethyl hexamethylene diisocyanate (TMHDI)
2-isocyanato ethyl 2,6 diisocyanatohexanoate (T-100)
polyurea derivative of 1,6-hexamethylene diisocyanate—(Desmodur N 3200)
a trimer derivative of 1, 6-hexamethylene diisocyanate (Desmodur N-3300)
low viscosity aliphatic isocyanate (Desmodur KL5-2550)

The more preferred aliphatic isocyanates useful in the primerless adhesive of this invention are trimethyl hexamethylene diisocyanate (TMXDI), an aliphatic diisocyanate based on a long chain dimerized fatty acid backbone containing 36 carbon atoms, Henkel Corporation, La Grange, Illinois (DDI 1410 diisocyanate), Desmodur N 3200 diisocyanate, isophorone diisocyanate (IPDI) and m-xylylene diisocyanate (MXDI). The most preferred aliphatic isocyanate in the practice of this invention is m-xylylene diisocyanate (MXDI). Of course, future developments such as commercial practicality and availability may affect the selection of the best adapted aliphatic isocyanate for use in the primerless adhesive. In the preferred embodiment of this invention from 0.5 to 6.0 parts by weight isocyanate or mixtures of isocyanates are used with 100 parts combined prepolymer and curative. In the more preferred embodiment of this invention from 1 to 4 parts by weight aliphatic isocyanate are used with 100 parts combined prepolymer and curative.

The following structures illustrate various aliphatic isocyanates.

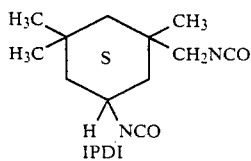
IPDI

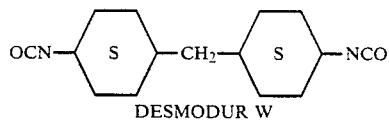
DESMODUR W

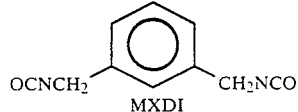
MXDI

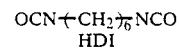
HDI

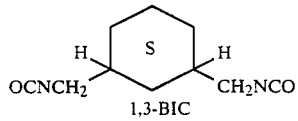
1,3-BIC

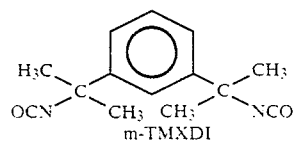
m-TMXDI

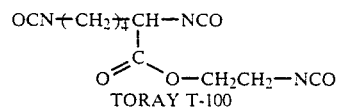
TORAY T-100

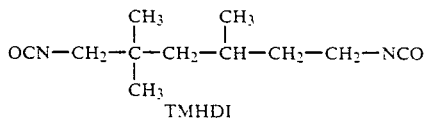
TMHDI

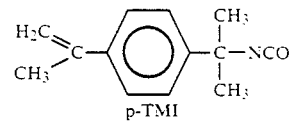
p-TMI

The curative component of the primerless adhesive of this invention is a mixture of active hydrogen containing materials of different molecular weights, a diamine, an optional urethane catalyst and an optional thickening agent/

The first ingredient of the curative is a polyether polyol having a functionality of 1.8 to 6.0 and a hydroxyl number from 100 to 1200. A hydroxyl number range of 200 to 700 and a functionality range of 3 to 5 are preferred. Suitable active hydrogen containing materials include diols, triols and tetrols, having primary, secondary and/or tertiary alcohol groups. Among the preferred polyether polyols are: Pluracol PeP 550 polyol, a propoxylated derivative of pentaerythritol having four secondary hydroxyl groups and a hydroxyl number of 450 available from BASF Wyandotte Corporation, Parsippany, N.J.; Pluracol P-355 polyol, an ethoxylated/propoxylated derivative of ethylene diamine having about 80% of its hydroxyl groups as primary and having a hydroxyl number of 450, also available from BASF Wyandotte Corporation; Thanol R470X polyol, available from Texaco Chemical Co., Bellaire, Tex., a propoxylated derivative of diethanolamine with a functionality of about 4 and a hydroxyl number of 500; Thanol SF-265 polyol, also available from Texaco Chemical Co., a propoxylated derivative of triethanolamine with a functionality of about 3 and a hydroxyl number of 600; and Dianol 2210 polyol, an ethoxylated derivative of bisphenol-A with a functionality of 2 and a hydroxyl number of 280, available from Akzo Chemie America, Chicago, Ill.

The second ingredient of the curative component is a diamine. Suitable diamines include: m-phenylene diamine, p-phenylene diamine, 4,4'-methylene dianiline, 4,4'-diaminodiphenyl sulfone, piperazine, 2,6-diaminopyridine, p,p'-methylene bis (orthochloroaniline), amino ethyl piperazine, isophoronediamine, diethyltoluene diamine, ethylene diamine, 1, 3 diaminopropane and mixtures of these organic diamines. The preferred diamines are piperazine, diethyl toluene diamine (DETDA), and Jeffamine D400 diamine, a polyoxypropylene diamine, available from Texaco Chemical Co., Houston, Tex. From 0.5 to 10.0 parts diamine are used in 100 parts curative.

The third ingredient of the curative component is an optional catalyst to facilitate the reaction between active hydrogen containing compounds and isocyanates. Suitable catalysts include tertiary amines and metallic catalysts including dibutyltin dilaurate, dibutyltin diacetate, ferric acetyl acetonate, nickel acetylacetonate, dibutyltin dialkyl acid, stannous octoate, dibutyltin diiso-octyl mercapto acetate, and mixtures of these catalysts. The preferred organo metallic catalyst is the dibutyltin dialkyl acid catalyst known as Dabco 125 catalyst available from Air Products, Allentown, Pa. The preferred tertiary amine catalyst is 1,4-diazabicyclo octane known as Dabco triethylene diamine catalyst also available from Air Products. Conventional catalytic amounts of organotin catalyst and tertiary amine catalyst are optionally used in the curative component. From about 0.1 parts by weight to 3 parts by weight organotin catalyst and from about 0.3 parts by weight to about 0.6 parts by weight amine catalyst are optionally used in 100 parts adhesive.

The preferred optional thickening agents are fumed silica available as Aerosil 200 fumed silica from Degussa Inc., New York, N.Y.; and Kaofile 2 thickener, a surface modified kaolinite (aluminum silicate) from Georgia Kaolin Company, Union, N.J.

Small amounts of other optional materials may also be added to the curative. These include coloring agents, for example, Stantone HCC 6783 green coloring agent from Harwick Chemical Company, Akron, Ohio, which is a blend of C.I. Pigment Green #7 and C.I. Pigment Black #7 dispersed in a polyoxypropylene polyol at 17.8 parts of pigment to 82.2 parts polyol. From 1.5 to 3.0 parts of an aromatic diisocyanate such as toluene diisocyanate may also optionally be included in the curative. The prepolymer and curative are generally used at a ratio of 4 parts by weight prepolymer to 1 part by weight curative. Thus, in a preferred embodiment of this primerless adhesive, there are 70 to 85 parts prepolymer, 0.5 to 6.0 parts aliphatic isocyanate and the remainder curative.

In practicing the process of the present invention the prepolymer is first prepared by reacting the excess aromatic polyisocyanate with polyol. Next the aliphatic isocyanate is blended with the prepolymer. This prepolymer blend is provided to the customer as one part of a two pack system. The curative component is provided in the other part of the two pack system. The customer combines the prepolymer blend pack with the curative pack in the desired ratio, usually 4 weight parts prepolymer is blended with 1 weight part curative. A static mixer may be used. The adhesive is applied to the first substrate by conventional means. The second substrate is then laminated over the first adhesive coated substrate. The adhesive is cured either at room temperature or by heating to 135° C. for 30 minutes.

The nature and advantage of this invention can be more readily seen and appreciated by reference to the following representative examples where all parts and percentages are by weight unless otherwise indicated. Also, all references cited herein are expressly incorporated herein by reference.

EXAMPLE 1

This Example 1 describes the preparation of a typical prepolymer component of the primerless adhesive of this invention. A prepolymer was made by adding, with a nitrogen purge, 100 parts of polypropylene oxide ether diol of 2000 molecular weight (Olin Poly-G 20-56 polyol, Olin Chemicals, Stamford, Conn.) followed by 54.4 parts dry Mistron RCS talc (Cyprus Industrial Minerals Company, Los Angeles, Calif.) with stirring and heating at 100° to 110° C. The wetted mix was sheared at high speed for 30 minutes. The temperature was then stabilized at 60° C. followed by one hour of vacuum heating at 26 inches mercury (30 inches mercury being full vacuum on the production gauge). Then, a mixture of 30.9 parts of Mondur MRS isocyanate and 54.2 parts of Isonate 143L isocyanate was added. The components were allowed to react under vacuum at 80–90° C. until the isocyanate content reached the theoretical value of 8.6%. A last component, 0.43 parts of zinc stearate, was then added. After about ten minutes of mixing the prepolymer was discharged. The finished product was transferred to a bucket and sealed under a nitrogen atmosphere. The viscosity was 27,000±5000 centipoise at 25° C.

EXAMPLE 2

This Example 2 describes the preparation of a curative component useful in the primerless adhesive of this invention. A curative was prepared by charging 34.9 parts Pluracol PeP 550 polyether tetrol of 500 molecular weight (BASF Wyandotte Corporation, Parsippany, N.J.) and 18.8 parts Pluracol 355 polyether tetrol of 500 molecular weight (BASF Wyandotte Corporation) to a reactor fitted with a lid, stirrer and degassing outlet.

The polyols were heated to 100–110° C. with stirring. Toluene diisocyanate in the amount of 1.3 parts, 3.5 parts Aerosil fumed silica thickening agent (Degussa Inc., New York, N.Y.), and 0.27 parts Stantone HCC 6783 green coloring agent were added sequentially; allowing time for each material to be dispersed uniformly in the mix. The mixture was degassed at 3 mm mercury for two hours. Anhydrous piperazine in the amount of 1.0 part (Texaco Chemical Co., Houston, Tex.) and triethylenediamine catalyst in the amount of 0.27 parts were added. The temperature was adjusted to 80° C. and the product was degassed for an additional 12 minutes. The curative component of the primerless adhesive of this invention had a viscosity of 10,000±1,500 centipoise at 25° C.

EXAMPLE 3

The following comparative Example 3 illustrates the use of a commercial adhesive on FRP substrates without the use of a primer.

Three inch by one inch pieces of Diversitech General GT-7113 FRP substrate were wiped clean with a paper tissue moistened with a 10% solution of isopropanol in water. Lap shear samples having bonded areas of 1"×1"×0.030" prepared by blending the prepolymer of Example 1 with the curative of Example 2 in a prepolymer: curative weight ratio of 4.0:1.0 (Equivalents curative/equivalents prepolymer of 0.91). Samples were postcured at 135° C. for one hour. Samples were conditioned in an oven at 82° C. for 15 minutes before testing on an Instron machine at 0.5"/min. crosshead speed (ASTM method D1002). The results are reported in Table 1. When the sample breaks cleanly between the adhesive layer and the substrate without any tearing or delamination of the FRP substrate the result is recorded as "no good" or "NG". When the sample piece breaks perpendicular to the edge of the adhesive the result is recorded as substrate failure "SF",

TABLE 1

Adhesion of Commercial Adhesive to Unprimed FRP
[Prepolymer of Example 1 and Curative of Example 2]

| | Lap Shear at 82° C., psi (% DL) |
|---|---|
| C4644-4-25 | 150 (NG) |
| | 140 (NG) |
| | 40 (NG) |
| | 70 (NG) |
| C4557-194-13 | 100 (NG) |
| | 10 (NG) |
| | 60 (NG) |
| average | 82 (NG) |

These results should be compared with those attained when the commercial FRP adhesive is used along with a commercial primer as described in Example 4 following.

EXAMPLE 4

In Comparative Example 4 the Example 1 prepolymer is blended with the Example 2 curative and applied to a substrate which has been previously treated with a commercially available primer. Following the procedure of Example 3, pieces of different grades of FRP substrates, GT 7113, GT 7101, RW 9468 and GT 8002, were treated with the commercially available PLIO-GRIP 6036 primer (Ashland Chemical Co., Columbus, Ohio). The prepolymer of Example 1 and the curative of Example 2 were blended in a prepolymer: curative weight ratio of 4.0:1.0 and applied as described in Example 3. This is a equivalents curative: prepolymer equivalent ratio of 0.9:1.0. Samples were postcured at 135° C. for one hour and conditioned at 82° C. for 15 minutes before testing as described in Example 3. The portion of the area of the 1"×1" surface of the break which is torn FRP substrate is reported as percent delamination, that is, where 25% of the surface is torn substrate and 75% of the surface of the break is adhesive the result is "25% delamination (DL)", where 75% of the surface of the break is torn substrate and 25% of the surface is adhesive the result is "75% delamination". The desired result is high bond strength with a high percent delamination. The results are reported in Table 2.

TABLE 2

ADHESION OF FOUR FRP SUBSTRATES
TO STANDARD COMMERCIAL ADHESIVE
USING COMMERCIAL PRIMER
Lap Shear, psi (% DL) measured at 82° C.

| 7113 | 7101 | 9468 | 8002 |
|---|---|---|---|
| 380 (80%) | 570 (90%) | 440 (30%) | 430 (70%) |
| 380 (45%) | 470 (80%) | 290 (98%) | 360 (95%) |
| 350 (100%) | 490 (95%) | 330 (75%) | 390 (95%) |
| 530 (100%) | | | |
| 450 (95%) | | | |
| 410 (95%) | | | |
| 460 (99%) | | | |
| 450 (100%) | | | |
| 480 (75%) | | | |
| 432 (86%) average | 510 (88%) average | 353 (68%) average | 393 (87%) average |

Comparison of the results in Table 1 and Table 2 shows that the commercial adhesive used without primer provides only a fraction of the bond strength achieved using primer. No substrate delamination occurs in the absence of primer. Use of commercial adhesive with primer provides substantial bond strengths and from 68 to 88% delamination.

EXAMPLE 5

This Example 5 illustrates the use of various aliphatic isocyanates to provide the primerless adhesive of this invention.

A number of aliphatic isocyanates were evaluated at 4.0% levels in the adhesive by adding 1.25 grams isocyanate to 24.0 grams of the prepolymer of Example 1. The curative of Example 2 in the amount of 6.0 grams was added and mixed for one minute. Samples were prepared as described in Example 3 and postcured at 135° C. for one hour. The following aliphatic isocyanates were used:
isophorone diisocyanate (IPDI)
bis (4-isocyanatocyclohexyl) methane (Desmodur W)
meta-xylylene diisocyanate (MXDI)
1,3 - bis (isocyanatomethyl) cyclohexane (1,3-BIC)
m-tetramethyl xylenediisocyanate (m-TMXDI)
dimethyl-p-isopropenyl benzyl isocyanate (p-TMI)
trimethyl hexamethylene diisocyanate (TMHDI)
2-isocyanatoethyl 2,6 diisocyanatohexanoate (T-100 Toray Industries, Inc., Tokyo, Japan)
a low viscosity aliphatic polyisocyanate from Mobay Chemical Corp. (Desmodur KL5-2550)
1,6-hexamethylene diisocyanate (HDI)

The ratio of equivalents of curative/prepolymer was 0.91. The equivalents of curative/prepolymer plus aliphatic isocyanate are stated in Table 3.

TABLE 3

| | 120-3 | 120-8 | 120-9 | 120-10 | 120-11 | 120-12 | 120-13 | 120-14 | 120-15 | 129-14 |
|---|---|---|---|---|---|---|---|---|---|---|
| Aliph NCO | IPDI | Des W | MXDI | 1,3-BIC | m-TMXDI | p-TMI | TMHDI | T-100 | KL5-2550 | HDI |
| Eq Curative/ Eq Prepolymer + Aliphatic NCO | 0.74 | 0.76 | 0.72 | 0.72 | 0.75 | 0.81 | 0.73 | 0.71 | 0.80 | 0.70 |
| Lap Shear, psi (% DL) at 82° C. | | | | | | | | | | |
| | 400 (20%) | 450 (NG) | 380 (100%) | 350 (NG) | 290 (NG) | 210 (SF) | 310 (NG) | 430 (100%) | 490 (100%) | 330 (100%) |
| | 390 (NG) | 430 (50%) | 380 (100%) | 440 (90%) | 300 (NG) | 340 (NG) | 360 (NG) | 360 (100%) | 425 (100%) | 270 (NG) |
| | 500 (90%) | 410 (NG) | 400 (85%) | 440 (90%) | 340 (NG) | 290 (NG) | 450 (NG) | 450 (98%) | 410 (97%) | 330 (NG) |
| | 420 | 350 | 370 | 510 | 370 | 320 | 490 | 480 | 370 | 320 |

TABLE 3-continued

|  | 120-3 | 120-8 | 120-9 | 120-10 | 120-11 | 120-12 | 120-13 | 120-14 | 120-15 | 129-14 |
|---|---|---|---|---|---|---|---|---|---|---|
|  | (65%) | (NG) | (75%) | (85%) | (NG) | (NG) | (95%) | (98%) | (97%) | (NG) |

Review of Table 3 shows bond strength results with all of the aliphatic isocyanates providing superior strengths to the Table 1 strengths where the commercial adhesive was also used without a primer. In addition several of the aliphatic isocyanates gave bonds which, on breaking, showed significant substrate delamination.

EXAMPLE 6

This Example 6 illustrates the effect of variation of lowering the ratio of the equivalents of curative to equivalents of prepolymer from 0.91 to 0.80 or 0.70 (curative level).

Different concentrations of isophorone diisocyanate (IPDI) were prepared as described in Example 5 at different curative levels using the prepolymer of Example 1 and the curative of Example 2. The results are reported in Table 4.

TABLE 4

|  | 125-1 | 125-2 | 125-3 | 125-4 | 125-5 | 125-6 |
|---|---|---|---|---|---|---|
| Prepolymer, g | 24.0 | 24.0 | 24.0 | 24.0 | 24.0 | 24.0 |
| IPDI, g | 0.30 | 0.60 | 0.90 | 0.30 | 0.60 | 0.90 |
| Curative, g | 4.60 | 4.60 | 4.60 | 5.26 | 5.26 | 5.26 |
| Eq. curative/prepolymer | 0.70 | 0.70 | 0.70 | 0.80 | 0.80 | 0.80 |
| Eq. curative/prepolymer + IPDI | 0.66 | 0.63 | 0.60 | 0.76 | 0.72 | 0.68 |
| Wt. % IPDI | 1.0 | 2.0 | 3.0 | 1.0 | 2.0 | 3.0 |
| Lap Shear, psi (% DL) at 82° C. | 440 (95%) | 440 (100%) | 460 (100%) | 430 (90%) | 500 (80%) | 425 (98%) |
|  | 470 (70%) | 400 (90%) | 390 (100%) | 470 (97%) | 490 (100%) | 440 (100%) |
|  | 430 (95%) | 420 (100%) | 450 (100%) | 380 (95%) | 430 (100%) | 420 (100%) |
|  | 470 (95%) | 440 (90%) | 500 (100%) | 475 (95%) | 460 (90%) | 420 (90%) |

EXAMPLE 7

This Example 7 reports the study of additional aliphatic isocyanates at various curative levels and isocyanate levels.

The results of blending the following aliphatic isocyanates with the prepolymer of Example 1 and then adding the curative of Example 2 are reported in the following Tables:

meta-xylylenediisocyanate, MXDI; Table 5
2-isocyanatoethyl 2,6 diisocyanatohexanoate, Toray T-100; Table 6
Desmodur KL5-2550; Table 7
1,3-bis(isocyanato methyl) cyclohexane, 1,3-BIC; Table 8

TABLE 5

|  | 125-21 | 125-22 | 125-23 | 125-24 | 125-25 | 125-26 | 125-27 | 125-28 |
|---|---|---|---|---|---|---|---|---|
| Prepolymer, g | 24.0 | 24.0 | 24.0 | 24.0 | 24.0 | 24.0 | 24.0 | 24.0 |
| MXDI, g | 0.30 | 0.60 | 0.90 | 1.25 | 0.30 | 0.60 | 0.90 | 1.20 |
| Curative, g | 6.0 | 6.0 | 6.0 | 6.0 | 4.60 | 4.60 | 4.60 | 4.60 |
| Eq. curative/prepolymer | 0.91 | 0.91 | 0.91 | 0.91 | 0.70 | 0.70 | 0.70 | 0.70 |
| Eq. curative/prepolymer + MXDI | 0.86 | 0.81 | 0.76 | 0.72 | 0.66 | 0.62 | 0.58 | 0.55 |
| Wt. %/MXDI | 1.0 | 2.0 | 3.0 | 4.0 | 1.0 | 2.0 | 3.0 | 4.0 |
| Lap Shear, psi (% DL) at 82° C. | 430 (95%) | 470 (100%) | 330 (60%)* | 470 (98%) | 500 (100%) | 450 (80%) | 440 (100%) | 560 (100%) |
|  | 410 (60%) | 440 (97%) | 295 (25%)** | 400 (100%) | 460 (100%) | 350 (100%) | 350 (100%) | 510 (95%) |
|  | 430 (80%) | 460 (97%) | 370 (10%)*** | 460 (100%) | 450 (100%) | 420 (100%) | 380 (100%) | 430 (100%) |
|  | 420 (75%) | 500 (65%) | 470 (80%) | 560 (98%) | 340 (100%) | 360 (100%) | 420 (100%) | 460 (100%) |

*40% Substrate Failure (SF)
**70% SF
***90% SF

TABLE 6

|  | 125-31 | 125-32 | 125-33 | 125-34 | 125-35 | 125-36 | 125-37 | 125-38 |
|---|---|---|---|---|---|---|---|---|
| Prepolymer, g | 24.0 | 24.0 | 24.0 | 24.0 | 24.0 | 24.0 | 24.0 | 24.0 |
| Toray T-100, g | 0.30 | 0.60 | 0.90 | 1.25 | 0.30 | 0.60 | 0.90 | 1.20 |
| Curative, g | 6.0 | 6.0 | 6.0 | 6.0 | 4.60 | 4.60 | 4.60 | 4.60 |
| Eq curative/prepolymer | 0.91 | 0.91 | 0.91 | 0.91 | 0.70 | 0.70 | 0.70 | 0.70 |
| Eq curative/prepolymer + T-100 | 0.85 | 0.80 | 0.76 | 0.71 | 0.65 | 0.61 | 0.58 | 0.55 |
| Wt % T-1000 | 1.0 | 2.0 | 3.0 | 4.0 | 1.0 | 2.0 | 3.0 | 4.0 |
| Lap Shear, psi (% DL) at 82° C. | 470 (90%) | 400 (100%) | 530 (100%) | 500 (100%) | 430 (100%) | 490 (100%) | 480 (100%) | 470 (100%) |
|  | 430 (97%) | 470 (100%) | 520 (100%) | 450 (100%) | 440 (100%) | 440 (100%) | 540 (100%) | 440 (100%) |
|  | 460 (90%) | 480 (100%) | 440 (100%) | 470 (98%) | 520 (100%) | 410 (100%) | 520 (100%) | 380 (100%) |
|  | 510 | 510 | 510 | 310 | 510 | 450 | 550 | 500 |

TABLE 6-continued

|  | 125-31 | 125-32 | 125-33 | 125-34 | 125-35 | 125-36 | 125-37 | 125-38 |
|---|---|---|---|---|---|---|---|---|
|  | (90%) | (100%) | (90%) | (100%) | (100%) | (100%) | (100%) | (100%) |

TABLE 7

|  | 128-5 | 128-6 | 128-7 | 128-8 | 128-9 | 128-10 | 128-11 | 128-12 |
|---|---|---|---|---|---|---|---|---|
| Prepolymer, g | 24.0 | 24.0 | 24.0 | 24.0 | 24.0 | 24.0 | 24.0 | 24.0 |
| KL 5-2550, g | 0.30 | 0.60 | 0.90 | 1.25 | 0.30 | 0.60 | 0.90 | 1.20 |
| Curative, g | 6.0 | 6.0 | 6.0 | 6.0 | 4.60 | 4.60 | 4.60 | 4.60 |
| Eq curative/prepolymer | 0.91 | 0.91 | 0.91 | 0.91 | 0.70 | 0.70 | 0.70 | 0.70 |
| Eq curative/prepolymer + KL52550 | 0.88 | 0.86 | 0.83 | 0.80 | 0.68 | 0.66 | 0.64 | 0.62 |
| Wt % KL 5-2550 | 1.0 | 2.0 | 3.0 | 4.0 | 1.0 | 2.0 | 3.0 | 4.0 |
| Lap Shear, psi (% DL) | 400 | 430 | 410 | 460 | 510 | 520 | 450 | 470 |
| at 82° C. | (NG) | (5%) | (NG) | (98%) | (100%) | (95%) | (100%) | (95%) |
|  | 390 | 390 | 520 | 420 | 580 | 490 | 430 | 410 |
|  | (50%) | (98%) | (50%) | (100%) | (100%) | (100%) | (90%) | (80%) |
|  | 430 | 410 | 500 | 420 | 470 | 460 | 490 | 400 |
|  | (90%) | (98%) | (95%) | (98%) | (97%) | (100%) | (90%) | (90%) |
|  | 400 | 420 | 540 | 400 | 470 | 430 | 330 | 400 |
|  | (90%) | (98%) | (100%) | (100%) | (100%) | (SF) | (SF) | (95%) |

TABLE 8

|  | 129-1 | 129-2 | 129-3 | 129-4 | 129-5 | 129-6 | 129-7 | 129-8 |
|---|---|---|---|---|---|---|---|---|
| Prepolymer, g | 24.0 | 24.0 | 24.0 | 24.0 | 24.0 | 24.0 | 24.0 | 24.0 |
| 1,3-BIC, g | 0.30 | 0.60 | 0.90 | 1.25 | 0.30 | 0.60 | 0.90 | 1.20 |
| Curative, g | 6.0 | 6.0 | 6.0 | 6.0 | 4.60 | 4.60 | 4.60 | 4.60 |
| Eq curative/prepolymer | 0.91 | 0.91 | 0.91 | 0.91 | 0.70 | 0.70 | 0.70 | 0.70 |
| Eq curative/prepolymer + 1,3-BIC | 0.86 | 0.81 | 0.77 | 0.72 | 0.66 | 0.62 | 0.59 | 0.56 |
| Wt % 1,3-BIC | 1.0 | 2.0 | 3.0 | 4.0 | 1.0 | 2.0 | 3.0 | 4.0 |
| Lap Shear, psi (% DL) | 320 | 470 | 460 | 440 | 510 | 230 | 390 | 110 |
| at 82° C. | (40%) | (98%) | (98%) | (100%) | (100%) | (NG) | (80%) | (NG) |
|  | 430 | 470 | 430 | 520 | 440 | 450 | 460 | 210 |
|  | (90%) | (98%) | (75%) | (98%) | (60%) | (100%) | (80%) | (NG) |
|  | 450 | 460 | 450 | 560 | 400 | 460 | 420 | 20 |
|  | (50%) | (95%) | (98%) | (98%) | (100%) | (90%) | (95%) | (NG) |
|  | 430 | 470 | 420 | 560 | 420 | 500 | 130 | 120 |
|  | (20%) | (100%) | (100%) | (98%) | (100%) | (90%) | (NG) | (NG) |

EXAMPLE 8

This Example 8 illustrates use of the aliphatic isocyanates of the primerless adhesive of this invention using a different prepolymer and a different curative from those of Example 1 and Example 2 previously used.

Following the procedures of Example 1 a different prepolymer was made using 100.0 g Terathane 2000 polyol, a polytetramethylene ether glycol available from DuPont having a molecular weight of 2000, 46.6 g Mistron RCS talc, 1.0 g Irganox 1010 antioxidant available from Ciba Geigy Corporation, and 85.1 g Isonate 143L modified diphenyl methane diisocyanate. This prepolymer had an isocyanate content of 8.7%. Aliphatic isocyanates: isophorone diisocyanate (IPDI), meta-xylylene diisocyanate (MXDI), 2-isocyanato ethyl 2,6 diisocyanato hexanoate (T-100) and Desmodur KL 5-2550 aliphatic isocyanate were each separately added to and blended with this prepolymer before adding a new curative made according to the procedure of Example 2 using the following: 95.9 g Thanol SF-265 polyol, 101.5 g Dianol 2210 polyol, 22.3 g diethyltoluene diamine and 54.9 g Kaofile-2 thickener.

The aliphatic isocyanates were added in the amounts shown to 25.0 g prepolymer and this blend added to 6.10 g curative. The equivalent curative/prepolymer ratio was 0.75.

Samples were postcured at 135° C. for one hour. Results of the lap shear adhesion tests at 82° C. are summarized in Table 9.

TABLE 9

|  | 126-1 | 126-2 | 126-3 | 126-4 | 126-5 | 126-6 | 126-7 |
|---|---|---|---|---|---|---|---|
| IPDI, g | 0.31 | 0.64 |  |  |  |  |  |
| MXDI, g |  |  | 0.31 | 0.64 |  |  |  |
| T-100, g |  |  |  |  | 0.31 | 0.64 |  |
| KL 5-2550, g |  |  |  |  |  |  | 0.31 |
| Eq curative/prepolymer plus aliph NCO | 0.71 | 0.67 | 0.70 | 0.66 | 0.70 | 0.66 | 0.73 |
| Wt. % Aliph Isocyanate | 1.0 | 2.0 | 1.0 | 2.0 | 1.0 | 2.0 | 1.0 |
| Lap Shear, psi (% DL) | 390 | 430 | 420 | 370 | 450 | 470 | 470 |
| at 82° C. | (98%) | (95%) | (100%) | (65%) | (50%) | (95%) | (100%) |
|  | 460 | 480 | 490 | 420 | 410 | 480 | 460 |
|  | (100%) | (95%) | (93%) | (100%) | (NG) | (98%) | (100%) |
|  | 440 | 410 | 440 | 360 | 450 | 450 | 440 |
|  | (98%) | (100%) | (100%) | (100%) | (85%) | (100%) | (100%) |
|  | 410 | 540 | 390 | 460 | 440 | 420 | 390 |
|  | (100%) | (90%) | (100%) | (100%) | (97%) | (95%) | (97%) |

EXAMPLE 9

In this following Example 9 a different curative was used with the prepolymer of Example 8 and each of the aliphatic isocyanates; isophorone diisocyanate (IPDI) meta-xylylene diisocyanate (MXDI) and 2-isocyantoethyl 2,6 diisocyanato hexanoate (T-100) was evaluated.

Another curative was prepared by combining, according to the procedure of Example 2, 90.0 g Thanol R470X polyol, 91.5 g Pluracol P-355 polyol, 22.3 g diethyl toluene diamine (DETDA) and 5.2 g Aerosil 200 fumed silica thickening agent. Different amounts of aliphatic isocyanate as shown on Table 10 were added to 25.0 g of the Example 8 prepolymer and then 4.62 grams of this Example 9 curative were added. The equivalent ratio of curative/prepolymer was 0.75. The substrate was Diversitech General GT-7113 FRP. Postcure was one hour at 135° C. Lap shear adhesion tests are summarized in Table 10.

TABLE 10

|  | 126-9 | 126-11 | 126-13 | 126-14 |
|---|---|---|---|---|
| IPDI, g | 0.30 | | | |
| MXDI, g | | 0.30 | | |
| T-100, g | | | 0.30 | 0.60 |
| Eq. curative/prepolymer plus Aliph NCO | 0.71 | 0.70 | 0.70 | 0.66 |
| Wt. % Aliph Isocyanate | 1.0 | 1.0 | 1.0 | 2.0 |
| Lap Shear, psi (% DL) at 82° C. | 440 (98%) | 470 (98%) | 450 (100%) | 500 (100%) |
|  | 450 (100%) | 440 (100%) | 460 (100%) | 490 (100%) |
|  | 440 (98%) | 460 (95%) | 450 (100%) | 520 (70%) |
|  | 440 (100%) | 510 (100%) | 410 (100%) | 450 (100%) |

EXAMPLE 10

This Example 10 illustrates the use of the most preferred aliphatic isocyanate in the primerless adhesive of this invention; an alternative curative is used. The prepolymer of Example 1 is blended with m-xylylene diisocyanate (MXDI) and then mixed with the new curative of Example 10.

Following the procedure of Example 2, Pluracol PeP 550 polyether tetrol in the amount of 34.89 grams, Pluracol P-355 polyol in the amount of 18.79 grams, Jeffamine D400 polymeric aliphatic diamine in the amount of 4.60 grams, triethylene diamine catalyst in the amount of 0.27 grams, 8.68 g Kaofile 2 filler and 0.27 g Stantone 6783 green coloring agent were combined. The theoretical hydroxyl number of this curative was 376.5. Following the test procedures of Example 3 different ratios of prepolymer/curative were evaluated. The substrate was GT-7113 FRP. The results are reported in Table 11.

TABLE 11

|  | 142-2 | 142-3 | 142-4 | 142-5 | 142-6 |
|---|---|---|---|---|---|
| Prepolymer/MXDI at 24.0/0.90, g | 24.90 | 24.90 | 24.90 | 24.90 | 24.90 |
| Curative, g | 7.85 | 6.75 | 6.23 | 5.64 | 5.09 |
| Eq. Curative/Prepolymer | 1.06 | 0.91 | 0.84 | 0.76 | 0.69 |
| Eq. Curative/Prepolymer + MXDI | 0.89 | 0.77 | 0.71 | 0.64 | 0.58 |
| Wt. % MXDI | 2.7 | 2.8 | 2.9 | 2.9 | 3.0 |
| Lap Shear, psi (% DL) at 82° C. | 120 (NG) | 500 (80%) | 410 (100%) | 440 (80%) | 320 (SF) |
|  | 70 (NG) | 480 (98%) | 320 (98%) | 330 (98%) | 440 (100%) |
|  |  | 510 (98%) | 380 (95%) | 430 (100%) | 370 (98%) |
|  |  | 430 (100%) | 390 (80%) | 440 (98%) | 90 (NG) |

EXAMPLE 11

This Example 11 illustrates results obtained when various additional aliphatic isocyanates were used in the primerless adhesive of this invention.

Following the procedure of Example 3 the following aliphatic isocyanates were added to the prepolymer of Example 1 and mixed with the curative of Example 2. The GT-7113 FRP substrate was used. The results are reported in the indicated tables.

Trimethylhexamethylene diisocyanate TMHDI —Table 12

1,6 Hexamethylene diisocyanate, HDI—Table 13

A diisocyanate based on a long chain, dimerized fatty acid backbone containing 36 carbon atoms, DDI 1410—Table 14

A polyurea derivative of 1,6-hexamethylene diisocyanate, Desmodur N-3200—Table 15

TABLE 12

|  | 146-6 | 146-7 | 146-8 | 146-9 | 146-10 |
|---|---|---|---|---|---|
| Prepolymer/TMHDI at 24.00/1.23, g | 25.23 | 25.23 | 25.23 | 25.23 | 25.23 |
| Curative, g | 6.58 | 5.99 | 5.39 | 5.00 | 4.61 |
| Eq. Curative/Prepolymer | 1.00 | 0.91 | 0.82 | 0.76 | 0.70 |
| Eq. Curative/Prepolymer + TMHDI | 0.81 | 0.73 | 0.66 | 0.61 | 0.57 |
| Wt. % MXDI | 3.9 | 3.9 | 4.0 | 4.1 | 4.1 |
| Lap Shear, psi (% DL) at 82° C. | 440 (98%) | 410 (98%) | 470 (100%) | 510 (95%) | 410 (NG) |
|  | 450 (95%) | 440 (90%) | 430 (SF) | 430 (93%) | 410 (100%) |
|  | 430 (90%) | 400 (40%) | 200 (NG) | 340 (90%) | 500 (98%) |
|  | 450 (95%) | 440 (60%) | 440 (100%) | 310 (90%) | 400 (100%) |

TABLE 13

|  | 129-11 | 129-12 | 129-13 | 129-14 | 129-15 | 129-16 | 129-17 | 129-18 |
|---|---|---|---|---|---|---|---|---|
| Prepolymer | 24.0 | 24.0 | 24.0 | 24.0 | 24.0 | 24.0 | 24.0 | 24.0 |
| HDI, | 0.30 | 0.60 | 0.90 | 1.25 | 0.30 | 0.60 | 0.90 | 1.20 |
| Curative | 6.0 | 6.0 | 6.0 | 6.0 | 4.60 | 4.60 | 4.60 | 4.60 |

TABLE 13-continued

|  | 129-11 | 129-12 | 129-13 | 129-14 | 129-15 | 129-16 | 129-17 | 129-18 |
|---|---|---|---|---|---|---|---|---|
| Eq. Curative/Prepolymer | 0.91 | 0.91 | 0.91 | 0.91 | 0.70 | 0.70 | 0.70 | 0.70 |
| Eq. Curative/(Prepolymer + HDI) | 0.85 | 0.80 | 0.75 | 0.70 | 0.65 | 0.61 | 0.57 | 0.54 |
| Wt. % HDI | 1.0 | 2.0 | 3.0 | 4.0 | 1.0 | 2.0 | 3.0 | 4.0 |
| Lap Shear, psi (% DL) at 82° C. | 390 (NG) | 410 (85%) | 400 (65%) | 330 (98%) | 350 (65%) | 450 (95%) | 120 (NG) | 230 (NG) |
|  | 420 (NG) | 390 (NG) | 360 (NG) | 270 (NG) | 510 (85%) | 110 (NG) | 10 (NG) | 350 (NG) |
|  |  | 430 (90%) | 420 (100%) | 330 (NG) | 450 (98%) | 150 (NG) |  | 490 (70%) |
|  |  | 430 (80%) | 460 (90%) | 320 (NG) | 420 (100%) | 530 (85%) |  | 450 (100%) |

TABLE 14

|  | 153-1 | 153-2 | 153-3 | 153-4 | 153-5 | 153-6 |
|---|---|---|---|---|---|---|
| Prepolymer, g | 24.0 | 24.0 | 24.0 | 24.0 | 24.0 | 24.0 |
| DDI 1410, g | 0.30 | 0.60 | 0.90 | 0.30 | 0.60 | 0.90 |
| Curative, g | 6.00 | 6.00 | 6.00 | 4.60 | 4.60 | 4.60 |
| Eq. Curative/Prepolymer | 0.91 | 0.91 | 0.91 | 0.70 | 0.70 | 0.70 |
| Eq. Curative/(Prepolymer + DDI) | 0.89 | 0.88 | 0.86 | 0.68 | 0.67 | 0.66 |
| Wt. % DDI | 1.0 | 2.0 | 3.0 | 1.0 | 2.0 | 3.0 |
| Lap Shear, psi (% DL) 82° C. | 440 (10%) | 380 (50%) | 440 (15%) | 570 (98%) | 440 (100%) | 430 (100%) |
|  | 500 (85%) | 400 (98%) | 380 (85%) | 440 (70%) | 520 (90%) | 460 (100%) |
|  | 440 (85%) | 400 (90%) | 410 (90%) | 460 (95%) | 460 (95%) | 560 (100%) |
|  | 430 (90%) | 360 (70%) | 360 (NG) | 500 (100%) | 520 (100%) | 510 (100%) |

TABLE 15

|  | 148-1 | 148-2 | 148-3 | 148-4 | 148-5 | 148-6 |
|---|---|---|---|---|---|---|
| Prepolymer, g | 24.0 | 24.0 | 24.0 | 24.0 | 24.0 | 24.0 |
| Desmodur N-3200, g | 0.30 | 0.60 | 0.90 | 1.25 | 0.30 | 0.60 |
| Curative, g | 6.00 | 6.00 | 6.00 | 6.00 | 4.60 | 4.60 |
| Eq. Curative/Prepolymer | 0.91 | 0.91 | 0.91 | 0.91 | 0.70 | 0.70 |
| Eq. Curative/(Prepolymer + N3200) | 0.88 | 0.85 | 0.83 | 0.80 | 0.68 | 0.65 |
| Wt. % N-3200 | 1.0 | 2.0 | 3.0 | 4.0 | 1.0 | 2.0 |
| Lap Shear, psi (% DL) 82° C. | 400 (90%) | 510 (100%) | 450 (95%) | 430 (100%) | 470 (100%) | 380 (100%) |
|  | 420 (55%) | 400 (100%) | 410 (100%) | 440 (100%) | 460 (100%) | 390 (100%) |
|  | 430 (85%) | 420 (100%) | 400 (95%) | 530 (98%) | 390 (100%) | 480 (100%) |
|  | 440 (85%) | 470 (90%) | 390 (10%) | 520 (95%) | 410 (100%) | 490 (100%) |

We claim:

1. A laminated composite comprising a first unprimed fiber reinforced polyester substrate having a second substrate adhesively bound thereto by the cured residue of an adhesive comprising a blend of a prepolymer component comprising the reaction product of a polyol and an aromatic isocyanate and having 3 to 15 percent free isocyanate groups; an aliphatic polyisocyanate and a curative component comprising a polyfunctional polyether polyol.

2. The laminated composite of claim 1 wherein said aliphatic polyisocyanate has an aliphatic carbon alpha to said isocyanate group wherein said alpha carbons are —CH$_2$R, —CHRR' or —CRR'R", where R, R' and R" are independently substituted or unsubstituted aromatic groups or substituted or unsubstituted aliphatic groups of six to forty carbon atoms.

3. The laminated substrate of claim 2 wherein said aliphatic isocyanate has a molecular weight from 120 to 700.

4. The laminated substrate of claim 3 wherein said aliphatic isocyanate is selected from the group consisting of isophorone diisocyanate, bis-(4-isocyanatocyclohexyl) methane, m-xylylenediisocyanate, 1,3-bis (isocyanatomethyl) cyclohexane, m-tetramethylxylene diisocyanate, dimethyl-p-isopropenyl benzyl isocyanate, trimethyl hexamethylene diisocyanate, 2-isocyanatoethyl 2, 6 diisocyanatohexanoate, hexamethylene diisocyanate and mixtures thereof.

5. The laminated substrate of claim 4 wherein said primerless adhesive comprises about 100 weight parts combined prepolymer and curative and from 0.5 to 6.0 weight parts aliphatic isocyanate.

6. The laminated substrate of claim 5 wherein said primerless adhesive comprises from 50 to 85 weight parts prepolymer, from 0.5 to 6.0 weight parts aliphatic isocyanate, and the balance curative to make 100 parts.

7. The laminated substrate of claim 6 wherein said primerless adhesive comprises about 80 parts prepolymer, about 20 parts curative and from 0.5 to 4.0 parts m-xylylenediisocyanate.

8. The substrate of claim 7 further comprising a urethane catalyst.

* * * * *